US007379704B2

(12) United States Patent
Parker et al.

(10) Patent No.: US 7,379,704 B2
(45) Date of Patent: May 27, 2008

(54) PROVIDING COLLABORATIVE SERVICES WITH CONTENT

(75) Inventors: Cameron Parker, Fall City, WA (US); Aaron Cornelius, Bellevue, WA (US); Margaret F. Fitzgerald, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1143 days.

(21) Appl. No.: 09/974,259

(22) Filed: Oct. 10, 2001

(65) Prior Publication Data

US 2003/0070176 A1 Apr. 10, 2003

(51) Int. Cl.
*G09B 3/00* (2006.01)

(52) U.S. Cl. .................. 434/350; 434/323; 434/118; 715/700; 715/751

(58) Field of Classification Search ............... 434/350, 434/118, 323; 715/700, 733, 734, 737, 751
See application file for complete search history.

(56) References Cited

U.S. PATENT DOCUMENTS

| | | | | |
|---|---|---|---|---|
| 4,622,013 A | * | 11/1986 | Cerchio | 434/118 |
| 4,715,818 A | * | 12/1987 | Shapiro et al. | 434/118 |
| 5,493,658 A | * | 2/1996 | Chiang et al. | 715/709 |
| 5,563,805 A | * | 10/1996 | Arbuckle et al. | 709/204 |
| 5,974,446 A | * | 10/1999 | Sonnenreich et al. | 709/204 |
| 6,125,358 A | * | 9/2000 | Hubbell et al. | 706/11 |
| 6,144,991 A | * | 11/2000 | England | 709/205 |
| 6,155,840 A | * | 12/2000 | Sallette | 434/323 |
| 6,470,170 B1 | * | 10/2002 | Chen et al. | 434/350 |

(Continued)

OTHER PUBLICATIONS

Timothy R. Larson, *Developing a Participatory Textbook for the Internet*, 29th ASEE/IEEE Frontiers In Education Conference, Nov. 10-13, 1999, San Juan Puerto Rico, vol. 3, pp. 13b7-1-13b7-6.

(Continued)

*Primary Examiner*—John M. Hotaling, II
*Assistant Examiner*—Travis Banta
(74) *Attorney, Agent, or Firm*—Workman Nydegger

(57) ABSTRACT

Systems and methods for integrating collaborative services with content. Collaboration services are provided to a user in the context of content such that the user may collaborate with other contacts or users within the context of the content. The collaborative services are accessed through a pane or window that initially displays a list of experts and peers as well as frequently asked questions links, availability data and configuration data. When a contact is selected, more details about the selected contact are provided to the user including a contact block that indicates how the user may collaborate with the selected contact. The contact block identifies modes of communication such as e-mail, instant messaging, video conferencing, threads, telephone, and the like. When a mode of communication is selected, the user may collaborate with the selected contact. The context of the content is often supplied to the selected contact to improve the collaboration.

37 Claims, 4 Drawing Sheets

U.S. PATENT DOCUMENTS

| | | | |
|---|---|---|---|
| 6,611,822 B1* | 8/2003 | Beams et al. | 706/11 |
| 6,691,159 B1* | 2/2004 | Grewal et al. | 709/219 |
| 6,829,585 B1* | 12/2004 | Grewal et al. | 705/8 |
| 6,947,914 B2* | 9/2005 | Bertrand et al. | 706/16 |
| 6,948,135 B1* | 9/2005 | Ruthfield et al. | 715/854 |
| 6,965,751 B2* | 11/2005 | Koga et al. | 434/350 |
| 6,973,482 B2* | 12/2005 | Mohammed et al. | 709/208 |
| 2001/0032244 A1* | 10/2001 | Neustel | 709/206 |
| 2002/0167539 A1* | 11/2002 | Brown et al. | 345/705 |
| 2003/0065955 A1* | 4/2003 | Kumhyr et al. | 713/202 |
| 2004/0244056 A1* | 12/2004 | Lorenz et al. | 725/135 |
| 2005/0014199 A1* | 1/2005 | Reche-Gallardo et al. | 435/7.1 |
| 2005/0147090 A1* | 7/2005 | Beck et al. | 370/352 |

OTHER PUBLICATIONS

Harry R. Matthews et al., *Evaluating On-Line Learning on Campus*, International Workshop on Advanced Learning Technologies, IWALT 200 Conference, Dec. 5, 2000, New Zealand (IEEE) pp. 109-112.

* cited by examiner

PROVIDING COLLABORATIVE SERVICES WITH CONTENT

BACKGROUND OF THE INVENTION

1. The Field of the Invention

The present invention relates to systems and methods for providing collaborative services. More particularly, the present invention relates to systems and methods for providing collaborative services within the context of content and more specifically to systems and methods for providing collaborative services within the context of an online course delivered to a user over a network such as the Internet.

2. Background and Relevant Art

Older technologies or ideas are constantly being rethought and improved as new ideas are implemented. This is evident in the Internet arena, which has brought significant improvements to our lives by revolutionizing many of our older technologies. Many of the technological changes have a significant impact on how certain activities are conducted.

For instance, catalogs provide people that do not want to go and visit a brick and mortar store with the ability to order and purchase the goods and services that are described in the catalogs. A consumer fills out an order form and mails the completed order form to the company that provided the catalog. Upon receipt of the order form, the catalog company will fill the order and ship the order to the consumer. While mail order catalogs still exist, some of these companies are taking advantage of the Internet and allowing users to shop online. The Internet streamlines the process of ordering goods and services and a consumer is able to enjoy their newly purchased products much sooner than if they ordered the same products from a catalog because the order is received much sooner by the catalog company and order processing is more automated.

In a similar manner, many people have chosen to take mail order courses instead of attending school or college or for other reasons. Mail order courses, however, are often a relatively slow process that can take a significant amount of time because the assignments and completed homework are sent back and forth between the teacher and the learner by mail. When it comes time to take a test for the mail order course, the user may be required to travel to a testing center in order to ensure that the test is fairly taken. The travel requirement, however, seems to defeat the purpose of a course that is taken by mail.

The Internet, however, has revolutionized this industry as well and courses that were previously taken by mail may now be taken online. Taking an online course provides distinct advantages. The course can be accessed at almost any time of the day or night and the user can take the course from the comfort of their own home. The users are not required to physically go to a classroom as all content is accessible from their computers. The pace of an online course can vary. Some online courses allow users to proceed at their own pace, while other courses are accelerated. In fact, many universities and colleges offer online courses that can be taken by almost anyone in the world including currently enrolled students.

Online courses or online learning, however, also has disadvantages. One disadvantage is related to the communication or interaction that a learner or user has with her peers or her teachers or with other experts. For instance, the course content is presented to the user over the user's computer and may include multimedia content. However, the user is unable to ask a question or comment on a particular topic in the context of the course and communication with other users is limited to written communication out of the context of the course.

If the user does have a question, it is possible that the user may send an e-mail to the instructor or course manager. However, the course will continue and the user will have to wait until they receive an answer to their e-mail. In addition, sending an e-mail typically requires the user to leave the context of the online course and enter their e-mail application. By the time the user is able to return to the online course, they may have lost valuable time and may have to repeat some of the course in order to refresh their memory with regard to the content that they were studying.

Instant feedback or communication with various peers within the context of the course's content is not usually possible. In a structured online course, for example, where a user is required to meet certain deadlines, the course may continue without interruption and the user must simply rely on himself or herself to correct misunderstandings without undue delay. The users do not have the support or advantage of interacting with their peers, who may be able to provide significant help. The users are unable to ask questions that have immediate feedback and cannot share their insights with others. The overall objective of most online courses is to increase learning or facilitate the learning process. The inability of users to interact with their peers while reading through static material is a detriment to online learning and is partly responsible for the attrition rates of online courses.

SUMMARY OF THE INVENTION

These and other problems are overcome by the present invention which provides systems and methods for providing collaborative services in the context of content. The collaborative services, when selected by a user, are displayed in a window pane without displacing content or information that they are currently viewing such that the collaborative services are provided in the context of the content. Collaborative services offer a user the ability to communicate and interact with other contacts such as peers, experts, and content authors without leaving the context of the content that they are experiencing.

Initially, the user is presented with various services such as a frequently asked questions (FAQ) link and a list contacts that typically includes both experts and peers. A user can access the FAQs at a point that is related to the content being displayed or the user is able to select a contact and interact with that contact using various modes of communication such as e-mail, instant messaging, voice (telephone or over Internet), video conferencing, and the like.

The user is able to search for specific peers or experts according to various characteristics, such as name, area of expertise, online status, and the like. Another advantage is the ability to recognize the content being displayed, extract keywords, and pre-filter the lists of experts and peers to find those experts and peers that have expertise or interest in the content that is being displayed to the user. After a contact has been selected, the user is presented with a profile of the selected contact. The user is also presented with a contact block that provides modes of communication through which the user may communicate or collaborate with the selected contact. The user, for example, may communicate with the contact using e-mail, instant messaging, telephone, voice over Internet, video conference, and the like or any combination thereof. In this manner, a user is able to communicate with a contact that is most likely able to assist the user while in the course's context or while viewing the content that gave rise to the user's question, for example.

In an online course, the overall objective of increasing learning is achieved because the collaborative services allow a user to interact or communicate with other peers or experts in different ways without exiting the online course. A user can thus receive an answer to a question immediately without having to wait for an answer to an e-mail, without falling behind in the course for failure to understand a certain concept, and the like.

The user does not leave the context of the course when accessing the collaborative services. Thus, the online course is no longer a static experience where the user simply reads text or listens to audio for example, but is one where the user is able to communicate or collaborate with others who are also associated with or are currently taking and viewing the course. This enhances the learning experience of the user.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
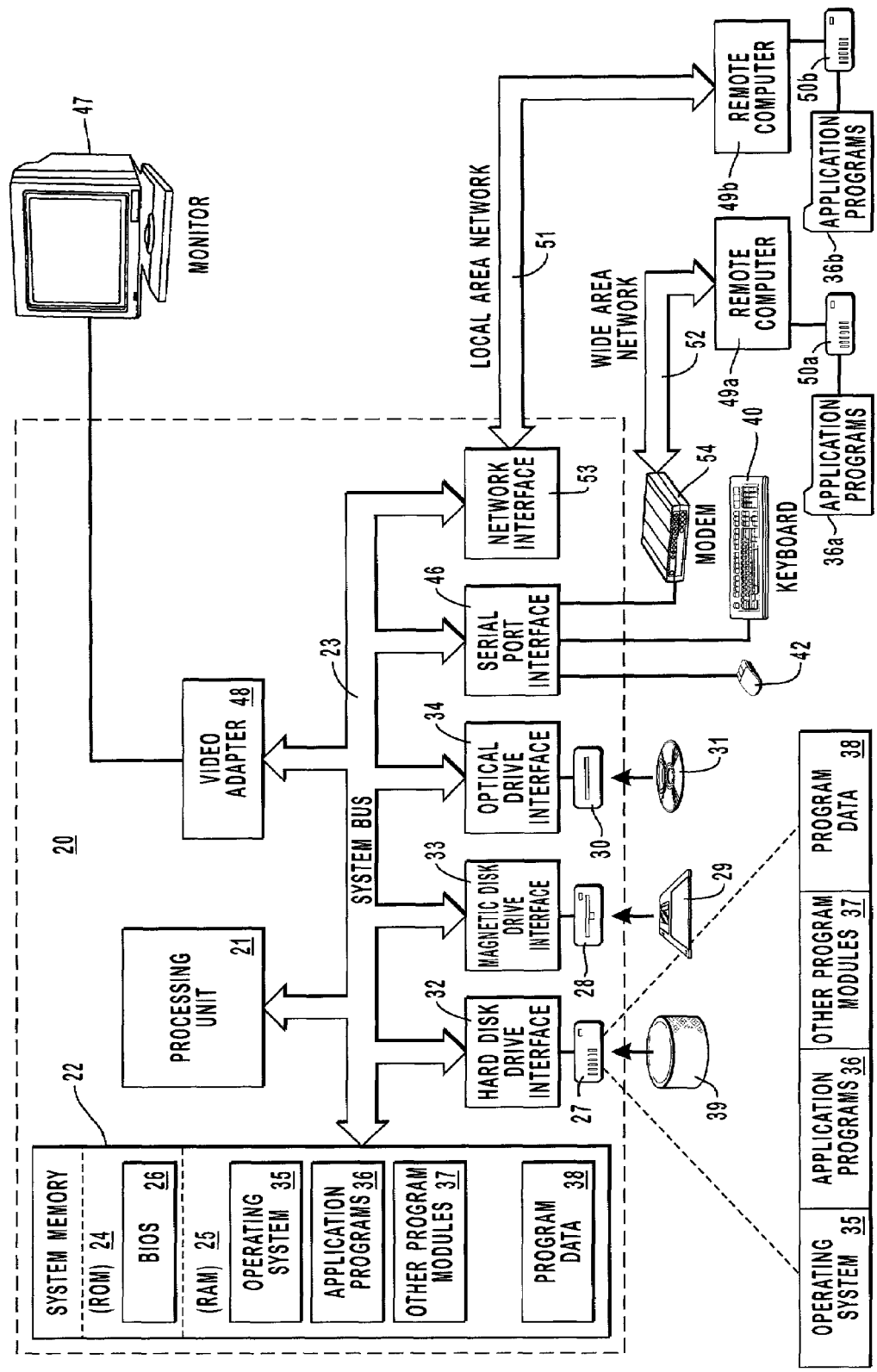
FIG. 1 illustrates an exemplary system that provides a suitable operating environment for the present invention.

The present invention provides collaborative services around content that is delivered to a user. In one example, the present invention provides collaborative services in the context of content that is delivered to a user in an online course over a network such as the Internet. The online course, which is typically stored on a server that is remote from the user, also includes a folder that stores contacts. Each contact, stored as an object in the contact list, represents someone that is associated with the course. The online course is typically the owner of the contact list and the contacts in the contact list are scoped or limited to those that are associated with the course. Exemplary contacts or users include, but are not limited to, peers or fellow students taking the course, experts such as instructors teaching the course, course authors, and the like.

Collaborative services in the context of content provides several advantages to the users who participate in the course and who are thus included in the contact list. The contact list effectively creates a community with whom the user may interact during the course. Because the number of users and/or experts may be large, a dynamic list of contacts is provided to the user in a collaboration window or pane that is provided in the context of the online course. The user can also search for a contact on the basis of name, availability, area of expertise, and the like. After a contact is selected, the user can collaborate or communicate with the selected contact using various modes of communication. A user can initiate a spontaneous conversation with a peer that promotes both the community of the course as well as the understanding of both users. The communication occurs in the context of the online course and allows the user to more quickly assimilate the course content.

The present invention thus extends to both methods and systems for providing collaborative service around content or more specifically, in the context of an online course. The present invention further extends to dynamically providing contacts to the user while in the context of the course content. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, video camera or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet, whether wired or wireless.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46 or a USB interface. In a networked environment, program modules depicted relative to the computer 20, or portions thereof, may be stored in the remote memory storage device. It will be appreciated that the network connections shown are exemplary and other means of establishing communications over wide area network 52 may be used.

The present invention provides collaborative services around content and allows users to receive contextual help relating to a current item or content. Providing collaborative services in the context of content is described herein with respect to online learning or courses delivered over a network, but can be used in other scenarios, such as on-the-job training, simple web browsing, and the like where content is delivered to a user. The present invention may also be utilized in situations where the content is not provided over a network, but is resident on the user's device or persistent storage such as a compact disc. By providing collaborative services in the context of content, a user is able to interact with peers and experts in an engaging and interactive way instead of interacting with static material.

Figure 2:
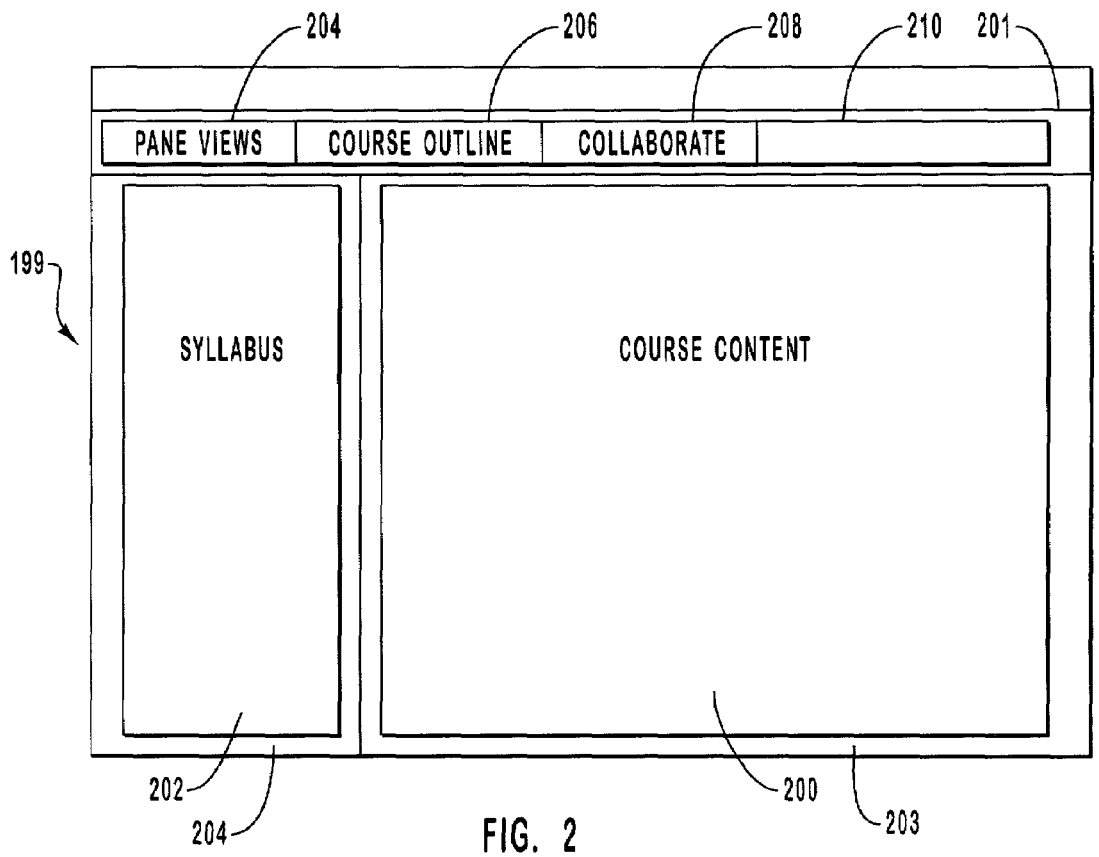
FIG. 2 illustrates a block diagram that illustrates an exemplary view of a user interface to an online course.

FIG. 2 is a block diagram that illustrates a user interface 199, in this example, for an online learning course that includes collaborative services. The course content 200 is displayed to the user and can include data as well as links to data. The course content 200 may also include, text, video, audio, links to other websites, and the like, or combinations thereof that facilitate learning or that are relevant to the course material. The course content 200 is static in the sense that the user does not interact with other users such as peers or fellow students, teachers, professors, content authors, and the like.

The user interface 199 includes buttons 201 that are used, for example, to navigate the course. Exemplary buttons or links include, but are not limited to, a pane views button 204, course outline button 206, collaborate button 208, and the like. The user interface 199 is divided, in this example into two panes: pane 204 which is displaying a syllabus 202 of the course and pane 203 which is displaying the course content 200. The user is able to begin accessing the collaborative services by selecting the collaborate button 208. The collaborative button 208 can also be selected in other ways including a drop down menu and the like. This user interface is exemplary, and it is understood that the collaborative services may be made available to the user in a different way.

Figure 3:
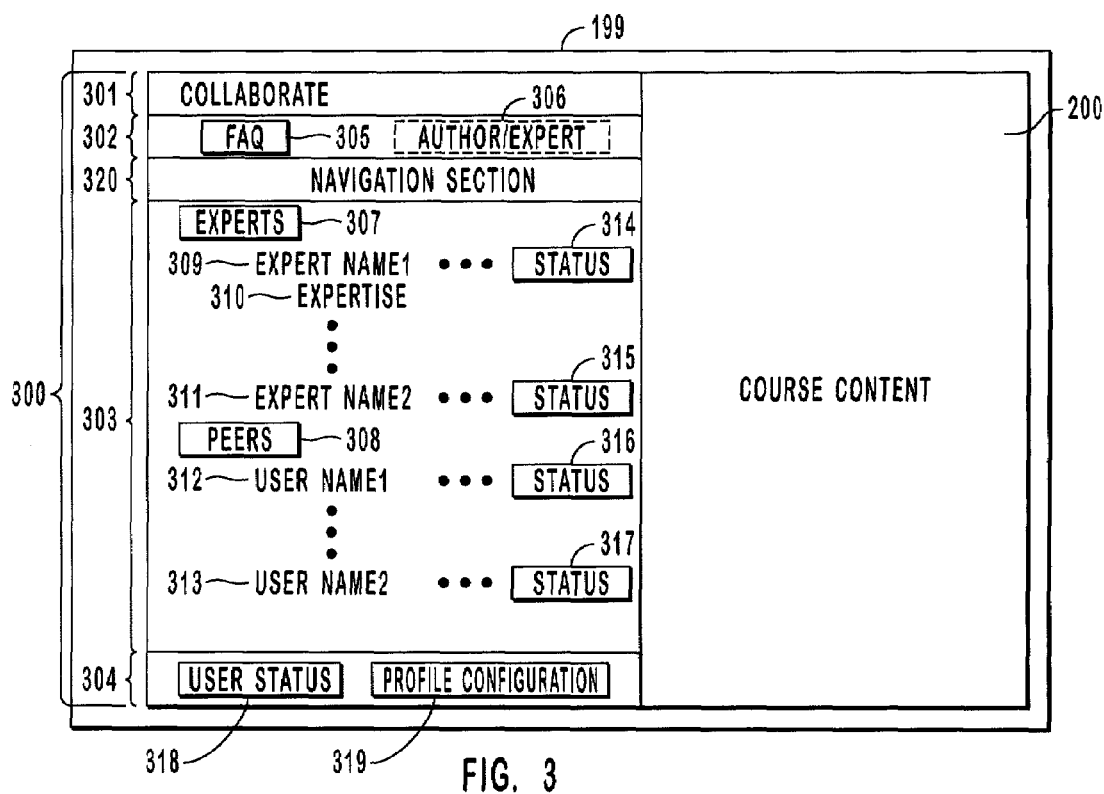
FIG. 3 is a block diagram that illustrates collaborative services that are provided in the context of course content.

FIG. 3 illustrates the user interface 199 where the course content 200 is being displayed and where the collaborate button 208 has been selected by the user to display a collaborate pane 300. In this example, the collaborate pane 300 has replaced the syllabus pane 202 that was previously displayed, but it is possible to simply resize the panes such that more panes are visible to the user. However, the collaborate pane 300 is shown in the context of the course content and is provided to the user.

When the collaborate pane 300 is selected, the course content 200 is not displaced or hidden from the user's view. The collaborate pane 300 is placed such that the collaborative services that can be accessed through the collaborate pane 300 are in the context of the course content 200. The user does not, therefore, have to leave the context of the online course in order to collaborate with other contacts. The collaborate pane 300 has various sections that may include, but are not limited to, a title section 301, a frequently asked questions (FAQ) section 302, a list section 303, and an availability section 304. The collaborate pane 300 can also include a navigation section 320.

The title section 301 is used to establish context for the collaborate pane 300. The user will often be presented with various panes in place of the collaborate pane 300 for various reasons as the user interacts with the online course. For example, the user may be utilizing other functionality associated with the online course or the user may not need any help at the moment. The title section 301 thus reminds the user of the functionality that can be accessed through the collaborate pane 300. Other panes, which may be selected through the pane views button 204 (shown in FIG. 2) may include the course syllabus, a printing pane and a take offline pane.

The FAQ section 302 is usually available if a FAQ file or location is specified in the metadata of the course, otherwise, the FAQ section 302 is omitted from the collaborate pane 300. The FAQ section 302, when selected, can be experienced from the point of view of the learner or user (peer view) and by the author of the content (expert view). From the viewpoint of the user, the frequently asked questions are accessed from a FAQ or peer link 305. In one example, a window will pop up that contains the FAQs when the link is selected by the user. The FAQ will open to a place that is related to the course content being displayed to the user. The window can be closed by any standard method of closing windows.

Content authors or experts, on the other hand, have permission to edit the FAQs. If the user is a content author, or an expert in some instances, an expert link 306 will also be displayed that will allow the content author and/or the expert to edit the FAQs. More generally, content authors and experts often have write and read privileges while users or peers typically have only read privileges with respect to the FAQs. Thus, the expert or the content author may be able to add a question to the FAQ that was submitted from a user such that all of the users/learners may benefit, edit existing FAQs, and the like or any combination thereof.

The list section 303 provides a user interface that allows the selection of a person or contact from a list of experts and/or from a list of peers. The example of FIG. 3 illustrates a list state in the list section 303 that includes an experts portion 307 and a peers portion 308. The experts and peers listed respectively in the experts portion 307 and the peers portion 308 are retrieved from a contact list (typically located on a remote server) that is associated with the course. Because each expert and/or peer is stored as a contact, personal and other information stored in the corresponding contact files, if available, may be displayed when the expert/peer is selected by the user.

The division of the list section 303 is primarily for the convenience of the learner or the user. Functionally, the expert portion and the peer portion can be implemented as a single list where some contacts that have been denoted as experts are dynamically retrieved from a remote server and displayed to a user and where some contacts that have been denoted as peers are dynamically retrieved from a remote server and displayed to the user. The terms expert and peer an intended to be representative rather than limiting. Terms such as trainers and learners could also be used. It is also possible to generate a list that is based on some other aspect other than expert/user. For instance, a list could be generated by those users that can be contacted by instant messaging versus those that cannot be contacted by instant messaging. The portions of the list are arbitrary and can be divided as desired by the users.

In the experts portion, the names of each expert are represented by expertname1 309 and expertname2 311. Associated with each named expert is their area of expertise. For example, the expertise area 310 is listed as the expertise of the expertname1 309. Similarly, the peer section 308 contains a list of names, represented by username1 312 and username2 313. In some instances, an area of expertise or interest may also be associated with each peer. The user understands that the peer is not an expert, but is a fellow student that feels comfortable with certain aspects of the course.

The list section 303 also displays a status for each expert/peer. The status can inform a user of whether the expert/peer is currently or logged in, online or otherwise available for collaboration with the user. In one instance, the status may reflect whether the user is active in the course. The status that is displayed to the user can be altered by the expert/peer whose status is being displayed. For example, a peer may be online but does not desire to be interrupted, in this instance, that peer can cause their status to reflect to other peers that they are unavailable. Thus the status 314 reflects the status of expertname1 309, the status 316 represents the status of the username1 312, and the like to a user. The status of a contact often has an effect on which contact is selected by a user and may also have an effect on which mode of communication is selected for collaboration by the user.

Experts are added to the course by one who has permission or authority (such as the course author or the course teacher) to add experts while a user (non-expert) may typically add themselves as a peer of the course. The peers and experts shown to the user in the list state can be displayed according to varying characteristics or protocols. For example, a display name or alias may be displayed if it exists. Otherwise, the displayed name may include a title, a first name, and a last name, if any of them exist.

The availability section 304 allows a user to set a user status 318 that is reflected to other peers or experts. The status 318 of a user that is thus displayed to others can affect whether other peers/experts initiate communication with the user. Exemplary statuses include, but are not limited to: available for questions, unavailable for questions, unavailable and logged off, and the like. In some instances the status 318 of a user is dependent on whether they have logged in to the course. Also, a user can cause a status to be displayed that is not indicative of their true status. Thus, an online user can reflect a status of offline, for example, if they do not wish to be disturbed.

The availability section 304 also includes a profile configuration 319. A user can choose, for example, to be a peer and permit themselves to be included in the peers section 308 in the profile configuration 319. Alternatively, the user can indicate in the profile configuration 319 that they do not want to be listed in the peers section 308 and that they do not want to be contacted by other users or learners.

Through the profile configuration 319, a user is able to determine and provide the information that will be made available to other contacts. That information may include, but is not limited to, a display name, a title, a first name, a middle name, a last name, a job title, a company, a business phone, a mobile phone, a web page address, a picture link, an e-mail address, and an instant message address. When a contact is selected, much of this information is provided in a details state discussed below. Thus, a picture of the contact can be displayed to the user. In addition, collaborating with the contact is easier because some fields, such as e-mail address, instant message address, and the like can be pre-populated using the profile data of the contact.

The navigation section 320 is often used to find an expert/peer, for example, by allowing the user to search for an expert/peer. The search criteria can be a name, an area of expertise, region, availability, and the like or any combination thereof. The navigation section 320 also provides information for the list section 303 such as, but not limited to, details, context, instructions, and content displayed. For example, the navigation section 320 as shown in FIG. 3 may contain a link to a search engine that allows the user to search for an expert/peer as described above and/or display the context of the collaborate pane.

Figure 4:
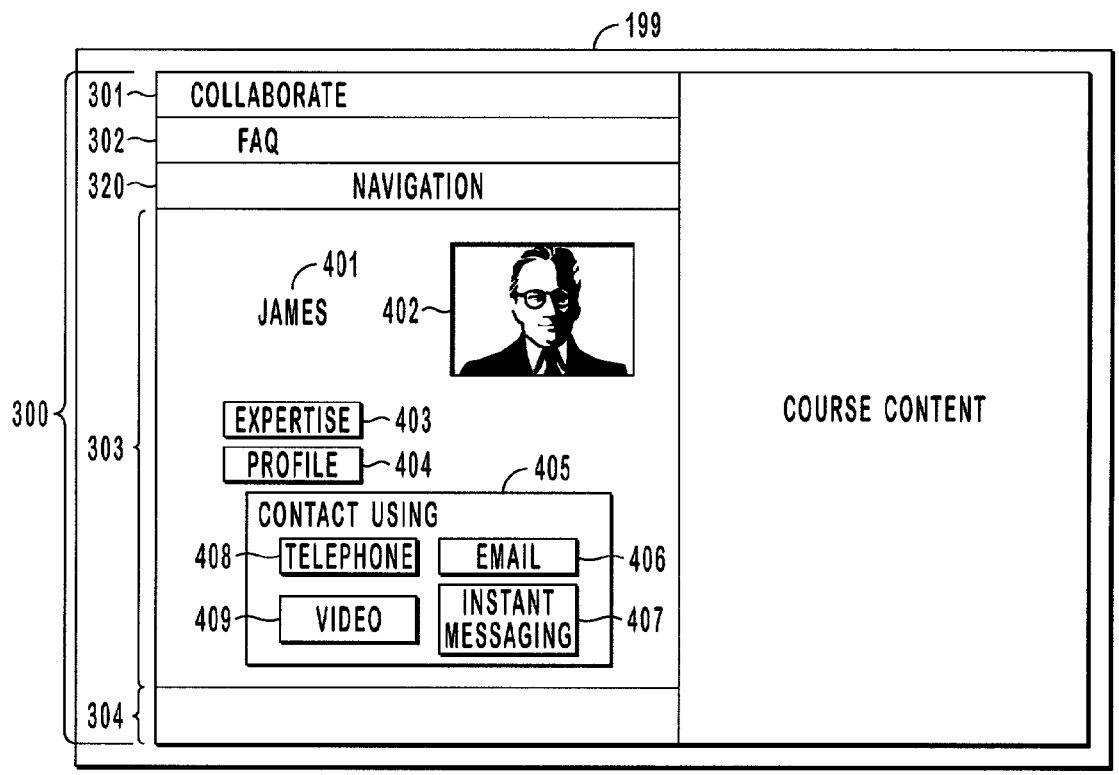
FIG. 4 is a block diagram that illustrates contact data including modes of communication in the context of course content.

The list section 303 also serves as part of the user interface to display other aspects of the collaborative services and will be described with reference to FIG. 4, and FIGS. 5A through 5D. FIG. 4 illustrates the list section 303 and the navigation section 320 after a person has been selected from either the expert section 307 or the peers section 308 illustrated in FIG. 3. In the list section 303, a details state is represented. The details state represents details about the contact (expert/peer) that has been selected by the user. As previously stated, much of this information is retrieved from the profile of the selected contact.

In the example of FIG. 4, the name 401 is displayed along with an image 402 of the contact if it is available. The area of expertise 403 is provided as well as a profile link 404 that the user may select to find more information about the contact. The navigation section 320, in the details state, displays the name of the contact and provides a link to select another person in this example.

The list section 303, when in the details state, also displays a contact block 405. The contact block 405 will display available modes of communication with which the user may collaborate or communicate with the contact. In this example, the user may collaborate with the contact using e-mail 406, instant messaging (IM) 407, telephone 408, and by video 409. If a particular mode of communication is not available, then a link is not displayed or is displayed in gray (disabled). In some instances, the modes of communication are only available if the user and/or the selected contact are signed or logged on to the course. The user is able to view the details state of the list section 303 in the context of the course content. The collaboration pane is used to display this data in a manner that ensures that the user is in the context of the course. Thus, the details of a particular contact may be viewed while the content is still being provided to the user.

The user is able to enter the conversation state when a mode of communication is selected from the contact block 405. These conversation states are represented by FIGS. 5A through 5D. Each conversation state is displayed in the list section 303 of the collaboration pane and in the context of the course and the course content. The conversation states described herein are exemplary and the present invention is not limited to these conversation states, but can be adapted to include others. The FIGS. 5A-5D may include other information that is relevant to the particular mode of communication and the present invention is not limited to the data shown in the Figures.

Figure 5A:
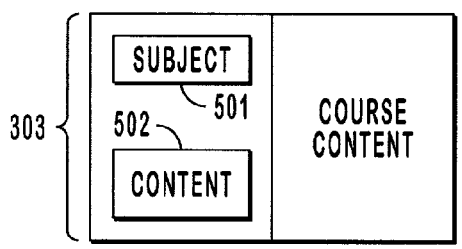
FIG. 5A is a block diagram that illustrates e-mail communication in the context of course content.
Figure 5B:
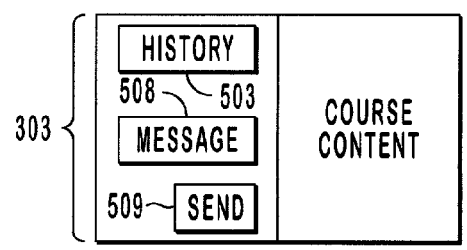
FIG. 5B is a block diagram that illustrates instant messaging in the context of course content.

FIG. 5A, for example, illustrates a conversation state when the mode of communication is e-mail. The subject 501 of the e-mail is often pre-filled according to the course content and thus provides context to the recipient of the e-mail. The e-mail is composed in the text box 502. The e-mail address is known because the e-mail link 406 was selected by the user and because the user has access to the contact or profile data that is stored for the selected contact. FIG. 5B illustrates a conversation state when the mode of communication is instant messaging. A history 503 of messages is provided to the user and the user may compose a message in the box 508 and send the instant message using the send button 509.

Figure 5C:
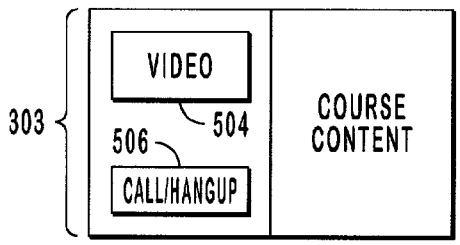
FIG. 5C is a block diagram that illustrates video communication in the context of course content.
Figure 5D:
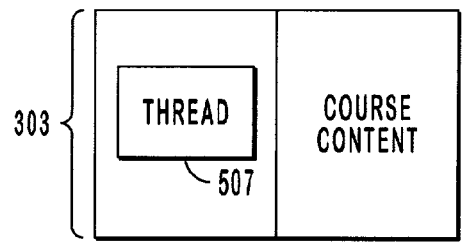
FIG. 5D is a block diagram that illustrates a discussion thread in the context of course content.

FIG. 5C illustrates a conversation state when the mode of communication is by video or by a video conference over a network such as the Internet. A video window 504 is provided and the user can initiate a call or terminate a call over the video conference. FIG. 5D illustrates a conversation state when the mode of communication is a discussion thread. The thread 507 is displayed in the list section 303 of collaborate pane. In this example, a discussion thread is a log of comments, suggestions, remarks, questions, and the like about a particular subject that are posted by various users. The discussion thread is typically available to all users and permits users to post and view comments, suggestions, remarks, questions, and the like.

In each conversation state, context can be automatically provided to the selected contact, for example, by providing a Uniform Resource Locator (URL) to the course content that is currently displayed. In an e-mail, the subject can be pre-populated with the course title, current topic, current page title, a URL, and the like or any combination thereof. Alternatively, this information can be pre-populated in the content of the e-mail. In instant messaging, the message field may be pre-populated with the URL or with other course information or any combination thereof. When a user finishes collaborating with the contact, the list section 303 may return to the list state.

Figure 6:
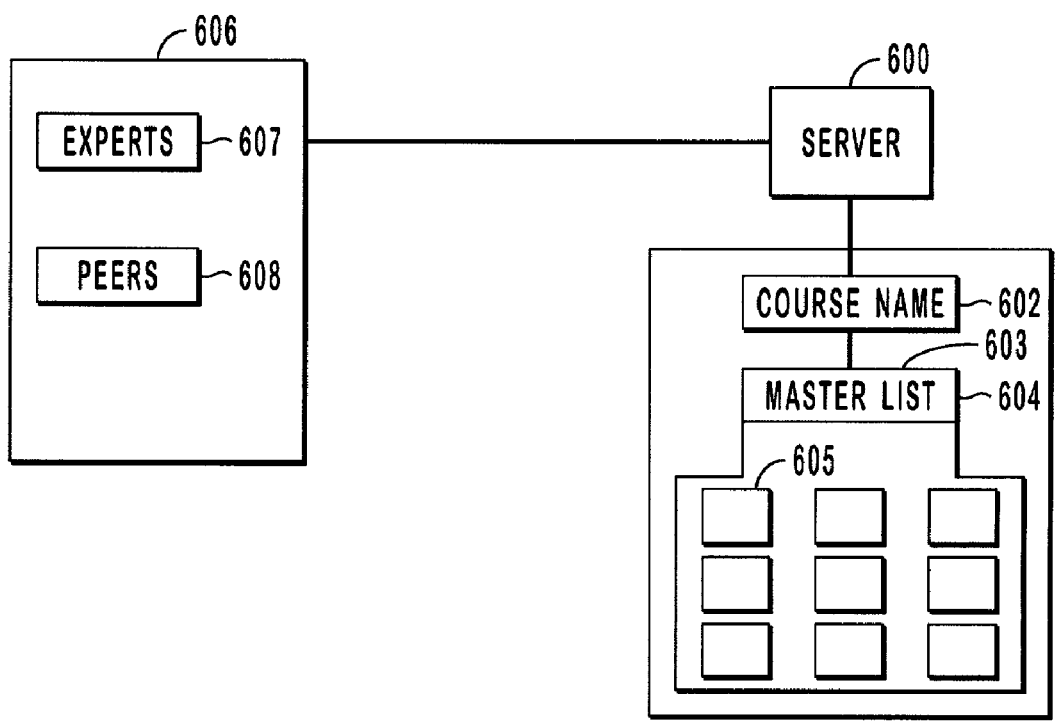
FIG. 6 is a block diagram that illustrates the contacts of an online course that are dynamically displayed to a user of the online course.

FIG. 6 is a block diagram that illustrates how the contacts (experts/peers) are stored. In this instance, the course is an online course and as a result, the course and the contacts are typically stored on a server 600. The server maintains a master list 603 of contacts 605 for the course that is identified by the course name 602, in this example. The master list 603 may be, for example a folder that stores individual files for each contact. Each contact 605 can be identified as either a peer, an expert, and/or an author in this example, but other organizations can also be used. As previously stated, these terms are exemplary in nature and not limiting. The information or profile data that is kept as part of each contact 605 was previously described and includes, but is not limited to, first name, last name, e-mail address, instant messaging address, telephone number, and the like.

For any given course, there may be a relatively large number of experts and/or peers and all of these contacts cannot be adequately displayed in the list section of the collaborate pane. In one example, a scroll bar is provided in both the expert portion and the peer portion of the list section and as a user scrolls through the experts or peers, additional experts or peers are dynamically obtained during the scrolling operation from the server 600, which stores the contacts for the course. For example, a pre determined number of experts or peers can be dynamically retrieved from the server 600 to stay ahead of the scrolling operation. This has the advantage of limiting the data that is transferred between the server and the client, which affects both the performance and user experience positively.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system that includes contact objects such as peer contact objects and expert contact objects that are associated with a course, wherein content of the course is delivered over a network to contacts represented by the contact objects, a method for integrating collaborative services with the content of the course such that users may collaborate in the context of the course's content, the method comprising:
   providing a user interface to a user, the user interface including a content pane for displaying course content to the user, the user interface further including a collaborate pane for facilitating communication between the user and one or more contacts, wherein course content previously selected by the user for display in the content pane is not displaced from the user when the collaborate pane is presented and remains displayed in the content pane throughout collaboration between the user and the one or more contacts;
   providing a list of contact objects within the collaborate pane, wherein the contact objects are dynamically selected based on the course content being displayed within the content pane, and for the course;
   selecting a contact object representative of a contact from the collaborate pane;
   providing the user with a contact block in the collaborate pane, wherein the contact block identifies one or more modes of communication that are available for collaboration with the selected contact; and
   collaborating with the selected contact over a particular mode of communication that is selected by the user from the contact block, wherein the collaboration over the particular mode of communication occurs through the collaborate pane which is simultaneously displayed with the previously selected course content, and within the context of the course content.

2. A method as defined in claim 1, wherein the act of selecting a contact object from the collaborate pane further comprises acts of:
   displaying expert contact objects in an expert portion of the list in the collaborate pane; and
   displaying peer contact objects in a peer portion of the list in the collaborate pane.

3. A method as defined in claim 2, wherein the act of selecting a contact object from the collaborate pane further comprises an act of displaying a status for each expert contact and for each peer contact, wherein each status affects a decision of the user to collaborate with that contact.

4. A method as defined in claim 1, further comprising an act of providing a navigation section in the collaborate pane, wherein the navigation section provides a collaboration context to the user that includes details about data displayed in the collaborate pane.

5. A method as defined in claim 1, further comprising an act of providing an availability section in the collaborate pane, wherein the availability section allows the user to select a status to be displayed to other contacts and to provide profile data that is available to other contacts.

6. A method as defined in claim 1, further comprising an act of displaying a details state that corresponds to a particular contact that is selected by the user, wherein the details state includes the contact block and wherein the details state provides profile data about the particular contact to the user.

7. A method as defined in claim 6, further comprising an act of displaying a communication state that corresponds to the particular mode of communication selected by the user from the contact block.

8. A method as defined in claim 7, wherein a reference to the content of the course is provided to the selected contact over the particular mode of communication without input from the user.

9. A method as defined in claim 1, wherein the one or more modes of communication comprise:
   e-mail;
   instant messaging;
   telephone;
   discussion threads; and
   video conferencing.

10. A method as defined in claim 1, further comprising an act of providing a frequently asked questions section in the collaborate pane, wherein the frequently asked questions section comprises:
   a peer link that provides access to frequently asked questions that are related to the content being displayed; and
   an expert link that is only provided to expert contacts, wherein the expert contacts may edit the frequently asked questions.

11. In a system including content that is delivered to a user over a network such as the Internet, wherein the content is also delivered to contacts including peers and experts, a method for a user to collaborate with peers and experts within a context of the content, the method comprising:
   providing a user interface to a user, the user interface including a content pane for making content available to the user, the user interface further including a collaborate pane for facilitating communication between the user and one or more contacts, wherein content is presented in to the user in the content pane, wherein the collaborate pane is provided without displacing previously presented content such that the content remains displayed in the content pane throughout communication between the user and the one or more contacts, and wherein the user accesses collaborative services through the collaborate pane;

providing a list section containing contact objects within the collaborate pane, wherein the contact objects are dynamically selected based on the content being displayed within the content pane, wherein the list section includes an expert portion and a peer portion and wherein the expert portion and the peer portion display one or more contact objects representative of contacts;

selecting a contact object from the list section, wherein the contact object is representative of either an expert or a peer contact;

displaying a details state for the selected contact in the list section, wherein the details state includes a contact block providing one or more modes of communication that available between the user and the selected contact; and selecting a mode of communication from the contact block, wherein the user is able to collaborate with the selected contact using the mode of communication and through the collaborate pane which is simultaneously displayed with the previously presented content, and within the context of the content.

12. A method as defined in claim 11, wherein the act of displaying a list section further comprises one or more of:

displaying a title section in the collaborate pane that informs the user of a purpose of the collaborate pane;

displaying a frequently asked questions section in the collaborate pane that provides a link to frequently asked questions;

displaying an availability section in the collaborate pane, wherein the availability section includes:
  a user status that allows the user to select a status to be reflected to other contacts; and
  a profile configuration that stores profile data of the user; and displaying a navigation section in the collaborate pane.

13. A method as defined in claim 12, wherein the act of displaying a frequently asked questions section further comprises:

displaying a link to frequently asked questions for both peers and experts; and displaying an expert link only to experts such that the experts may edit the frequently asked questions, wherein only experts view the expert link.

14. A method as defined in claim 11, wherein the act of selecting a contact object from the list section further comprises and act of searching for a contact.

15. A method as defined in claim 11, wherein the act of searching for a contact further comprises searching according to one or more of a first name, a last name, an alias, a status, and an area of expertise.

16. A method as defined in claim 11, wherein the act of displaying a details state of the selected contact in the list section further comprises:

an act of displaying one or more modes of communication, wherein the modes of communication comprise: e-mail; instant messaging; video communication; threads; and telephone; and an act of displaying profile data for the selected contact.

17. A method as defined in claim 11, wherein the act of selecting a mode of communication from the contact block further comprises an act of pre-populating a portion of the mode of communication with a subject that comprises one or more of a URL, a course title, a course topic, and a course page title, wherein the subject relates to the content and wherein the URL allows the user to navigate to the content.

18. A method as defined in claim 11, wherein the contact objects displayed in the peer portion and in the expert portion of the list section are owned by a provider of the content.

19. In a system including an online course that provides course content to peers and experts over a network such as the Internet, a method for providing collaborative services that permit the peers and the experts to collaborate within a context of the online course, the method comprising:

causing a collaborate pane to be displayed in the context of online course content previously presented to a user, wherein the online course content is not hidden from the user's view by the collaborate pane and remains in the user's view throughout collaboration between the user and one or more contacts, and wherein the collaborate pane includes a list section;

dynamically retrieving contact objects representative of one or more of peer contacts from a remote server, the contact objects being dynamically retrieved based on the online course content being displayed within the content pane for the online course;

displaying the dynamically retrieved contact objects to the user in a list section, wherein the contact objects are displayed in at least one of a peer portion and an expert portion;

retrieving profile data that corresponds to a contact selected by the user from either the expert portion or the peer portion;

displaying a details state of the selected contact to the user in the list section, wherein the details state displays the profile data of the selected contact and wherein the details state includes a contact block that identifies one or more modes of communication through which the user may collaborate with the selected contact; and facilitating collaboration between the user and the selected contact over a mode of communication selected by the user and through the collaborate pane, wherein the collaborate pane through which communication is made is displayed simultaneously with the previously presented online course content and within the context of the online course content.

20. A method as defined in claim 19, further comprising an act of displaying a conversation state when the user selects a particular mode of communication From the one or more modes of communication in the contact block.

21. A method as defined in claim 20, wherein the conversation state provides fields that correspond to the particular mode of communication, further comprising an act of pre-populating a field with a subject, the subject comprising one or more of a URL, a course topic, a course title, and a course page title, wherein the subject identifies a particular portion of the online course, and wherein the URL allows a contact to navigate to the content.

22. A method as defined in claim 20, wherein the conversation state comprises one or more of e-mail, instant messaging, video conferencing, telephone, and threads.

23. A method as defined in claim 19, further comprising an act of displaying, in the collaborate pane, one or more of:
  a title section;
  a navigation section;
  a frequently asked questions section; and
  an availability section, wherein the availability section includes:
    a user status that allows the user to select a user status that is reflected to other contacts; and a profile configuration that allows the user to provide profile data that is made available to other contacts.

24. A method as defined in claim 23 wherein the act of displaying a frequently asked questions section further comprises:
    displaying a link to frequently asked questions that is accessible by peers and experts; and
    displaying an expert link only to experts such that the experts may edit the frequently asked questions.

25. A method as defined in claim 19 wherein the contact objects comprise expert contact objects and peer contact objects, the method further comprising a step for displaying the dynamically retrieved expert contact objects in the expert portion of the list section and a step for displaying the dynamically retrieved peer contact objects in the peer portion of the list section.

26. A method as defined in claim 25, wherein the act of displaying the dynamically retrieved expert contact objects and the dynamically retrieved peer contact objects further comprises an act of displaying a status for the corresponding experts and peers represented by the contact objects that are displayed in the list section.

27. A method as defined in claim 25, further comprising an act of displaying the expert contact objects and the peer contact objects to the user when the collaboration with the selected contact is finished such that another contact may be selected by the user.

28. In a system that includes contact objects such as peer contact objects and expert contact objects that are associated with a course, wherein content of the course is delivered over a network to contacts represented by the contact objects, a computer program product for implementing a method for integrating collaborative services with the content of the course such that the user may collaborate in the content's context, the computer program product comprising:
    tangible computer-readable media having computer executable instructions stored thereon for performing the method, the method comprising:
        providing a user interface to a user, the user interface including a content pane for making course content accessible to the user, the user interface further including a collaborate pane for facilitating communication between the user and one or more contacts, wherein the collaborate pane is provided in the course content's context;
        providing a list of contact objects within the collaborate pane wherein the contact objects are dynamically selected based on the course content being displayed within the content pane for the course;
        selecting a contact object representing a contact from the collaborate pane,
        providing the user with a contact block in the collaborate pane, wherein the contact block identifies one or more modes of communication that are available for use with the selected contact; and
        collaborating with the selected contact over a particular mode of communication that is selected by the user from the contact block, wherein the collaboration over the particular mode of communication occurs through the collaborate pane which is simultaneously displayed with previously displayed course content and within the course content's context, such that during collaboration between the user and the selected contact, the previously displayed course content continues to be displayed.

29. A computer program product as defined in claim 28, wherein the act of selecting a contact object from the collaborate pane further comprises acts of:
    displaying expert contact objects in an expert portion of the collaborate pane, wherein the expert contact objects are dynamically retrieved from a remote server; and
    displaying peer contact objects in a peer portion of the collaborate pane, wherein the peer contact objects are dynamically retrieved from a remote server.

30. A computer program product as defined in claim 29, wherein the act of selecting a contact object from the collaborate pane further comprises an act of displaying a status for each expert contact and for each peer contact, wherein each status affects a decision of the user to collaborate with that contact.

31. A computer program product as defined in claim 28, further comprising an act of providing a navigation section in the collaborate pane, wherein the navigation section provides a collaboration context to the user that includes details about data displayed in the collaborate pane.

32. A computer program product as defined in claim 28, further comprising an act of providing an availability section in the collaborate pane, wherein the availability section allows the user to select a status to be displayed to other contacts and to provide profile data that is available to other contacts.

33. A computer program product as defined in claim 28, further comprising an act of displaying a details state that corresponds to a particular contact that is selected by the user, wherein the details state includes the contact block and wherein the details state provides profile data about the particular contact to the user.

34. A computer program product as defined in claim 33, further comprising an act of displaying a communication state that corresponds to the particular mode of communication selected by the user from the contact block.

35. A computer program product as defined in claim 34, wherein the content of the course is provided to the selected contact over the particular mode of communication without input from the user.

36. A computer program product as defined in claim 28, wherein the one or more modes of communication comprise:
    e-mail;
    instant messaging;
    discussion threads; and
    video conferencing.

37. A computer program product as defined in claim 28, further comprising an act of providing a frequently asked questions section in the collaborate pane, wherein the frequently asked questions section comprises:
    a peer link that provides peer contacts with access to frequently asked questions that are related to the content being displayed; and
    an expert link that is only provided to expert contacts, wherein the expert contacts may edit the frequently asked questions.

* * * * *

UNITED STATES PATENT AND TRADEMARK OFFICE
CERTIFICATE OF CORRECTION

| | | |
|---|---|---|
| PATENT NO. | : 7,379,704 B2 | Page 1 of 1 |
| APPLICATION NO. | : 09/974259 | |
| DATED | : May 27, 2008 | |
| INVENTOR(S) | : Cameron Parker et al. | |

It is certified that error appears in the above-identified patent and that said Letters Patent is hereby corrected as shown below:

In column 14, line 46, in Claim 20, delete "From" and insert -- from --, therefor.

In column 15, line 3, in Claim 24, delete "claim 23" and insert -- claim 23, --, therefor.

In column 15, line 10, in Claim 25, delete "claim 19" and insert -- claim 19, --, therefor.

In column 15, line 52, in Claim 28, delete "pane." and insert -- pane; --, therefor.

Signed and Sealed this
Third Day of May, 2011

David J. Kappos
*Director of the United States Patent and Trademark Office*